United States Patent [19]

Barton et al.

[11] 4,285,160
[45] Aug. 25, 1981

[54] ANGLE ROPE WEED KILLER

[76] Inventors: Joseph J. Barton; Bobby G. Boyd, both of P.O. Box 341, Hale Center, Tex. 79041

[21] Appl. No.: 72,301

[22] Filed: Sep. 4, 1979

[51] Int. Cl.³ .................. A01M 21/00; A01N 5/00
[52] U.S. Cl. .................................. 47/1.5; 239/43
[58] Field of Search ............... 47/1.5; 239/145, 146, 239/149, 159, 163, 43; 222/187; 119/157; 403/273

[56] References Cited

U.S. PATENT DOCUMENTS

| | | | |
|---|---|---|---|
| 1,109,060 | 9/1914 | Griffin | 47/1.5 |
| 1,129,772 | 2/1915 | Womack | 239/43 |
| 1,523,590 | 1/1925 | Hartshorn | 47/1.5 |
| 1,568,448 | 1/1926 | Freeman | 239/149 |
| 1,764,952 | 6/1930 | Hay | 47/1.5 |
| 1,818,369 | 8/1931 | Watson et al. | 47/1.5 |
| 2,068,518 | 1/1937 | Simpson | 239/43 |
| 2,123,988 | 7/1938 | Corley | 111/6 X |
| 2,158,115 | 5/1939 | Fulliloue | 47/1.5 |
| 2,223,809 | 12/1940 | Rucker | 47/1.5 |
| 2,892,448 | 6/1959 | Merwin | 119/157 |
| 2,935,818 | 5/1960 | Crane | 47/1.5 |
| 2,956,543 | 10/1960 | Kirk | 119/157 |
| 3,021,642 | 2/1962 | Ewing | 47/1.5 |
| 3,077,701 | 2/1963 | Osmun | 47/1.5 |
| 3,320,694 | 5/1967 | Biron | 47/1.5 |
| 4,019,278 | 4/1977 | McKirdy | 47/1.5 |
| 4,138,113 | 2/1979 | Sheldon, Jr. | 402/273 X |
| 4,140,412 | 2/1979 | Vitt | 403/273 X |
| 4,187,638 | 2/1980 | Hardy et al. | 47/1.5 |
| 4,219,964 | 9/1980 | Dale | 47/1.5 |

FOREIGN PATENT DOCUMENTS 1493029  8/1967  France ............................ 47/81

OTHER PUBLICATIONS

"Wick" Weeds to Death, p. 20, Progressive Farmer, Apr. 1979.
The Rope Wick Applicator Dale Mississippi Agric. & Forestry Experiment Station, 7/5/78.

Primary Examiner—Steven A. Bratlie
Attorney, Agent, or Firm—Wendell Coffee

[57] ABSTRACT

A series of wick ropes are pressure fed with herbicide. They are moved along weeds to be killed at about a 35° angle so that the ropes wipe along the weeds applying herbicide thereto. Each rather short section of rope is fed by a different reservoir so that if the applicator is on a slope as by a roadside, the head upon the ropes at one end is not much greater than upon the other end.

9 Claims, 6 Drawing Figures

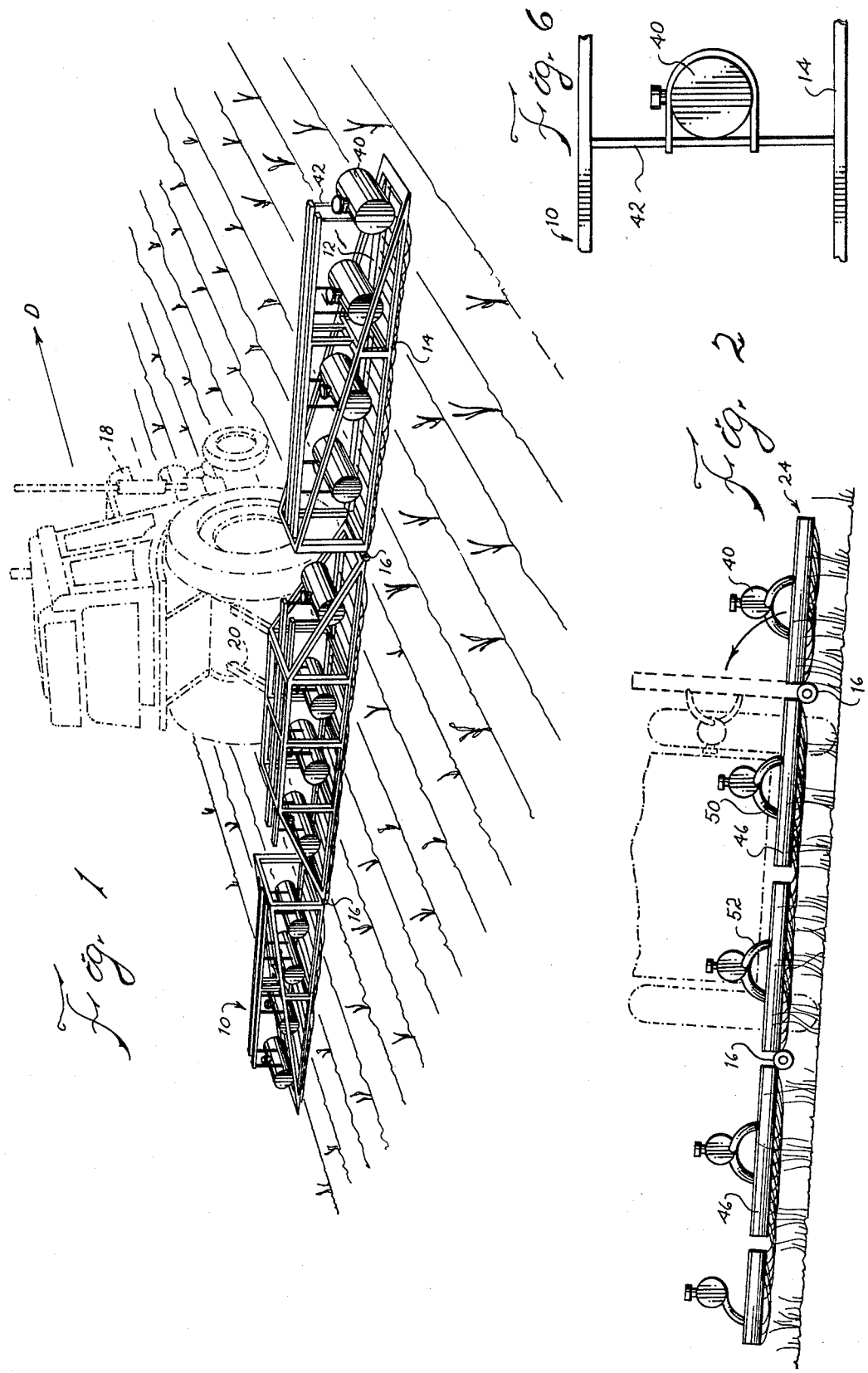

ANGLE ROPE WEED KILLER

CROSS REFERENCE TO RELATED APPLICATIONS

This application is co-pending with our prior application, Ser. No. 951,448, filed Oct. 16, 1978 and entitled WET ROPE WEED KILLER.

BACKGROUND OF THE INVENTION (1) Field of the Invention

This invention relates to agriculture and more particularly to the application of herbicide.

(2) Description of the Prior Art

The use of herbicides for the control of weeds is widespread in agriculture today. Generally pre-plant and pre-emergent herbicides may be broadcast over fields without injury to crops. Few herbicides, however, are specific for weeds alone and so once a crop has emerged it is necessary to treat only the weed with herbicide to avoid killing the crop plant. The problem is aggravated in the western regions of the United States which have high temperatures, low humidity and dry winds. With the application of herbicides by a damp applicator, there is a very high evaporation rate from the applicator so that it is necessary to continually replinish the fluid supply of herbicide to the applicator.

Selective means for the dispensation of herbicides have recently come to be known. These methods of treating weeds have become increasingly important as "hoe hands", who manually kill weeds are unavailable. Also, general distribution of even pre-plant or pre-emergent herbicide stunts the growth of many crops.

Methods of selectively applying herbicides to weeds after the emergence of a crop have largely been very involved mechanically or ineffective. Heretofore, no simple method for selective application of herbicides to weed after emergence of crops has been known in the art.

In addition to agricultural weed killing, there exists a problem for governmental units killing weeds and tall grasses along the right-of-way of public roads. Often the roadsides are sloped, and sometimes sloped sharply away from the roadway. Therefore, the vehicle carrying any applicator must necessarily operate with one side of the applicator far lower than the other side of the applicator.

Before filing this application, applicant caused a search of the prior art to be made at the United States Patent and Trademark Office. That search revealed the following patents:

U.S. Pat. No. 1,109,060, Griffin
U.S. Pat. No. 1,523,590, Hartshorn
U.S. Pat. No. 1,764,952, Hay
U.S. Pat. No. 1,818,369, Watson
U.S. Pat. No. 2,123,988, Corley
U.S. Pat. No. 2,935,818, Crane
U.S. Pat. No. 3,021,642, Ewing
U.S. Pat. No. 3,077,701, Osmun
U.S. Pat. No. 3,320,694, Biron
U.S. Pat. No. 4,019,278, McKirdy EWING discloses a solid sheet-like wick extending from the bottom of a header with a few inches of head thereon.

HAY disclosed a boll weevil poisoner having wet strands hanging from a chamber with liquid therein.

WATSON shows a series of strands hanging down vertically from an axial pipe which distributes the liquid to it.

While the other patents cited are thought by applicants to be of little interest with respect to their invention, other workers in the field are continuing to work in this area. Reference is particularly made to our prior patent application, wherein work done by the United States Department of Agriculture, and particularly Dr. J. E. Dale is described. Applicants believe that Dr. Dale has filed a U.S. Patent Application, Ser. No. 969,036 entitled ROPE WICK APPLICATOR.

Also within recent months, certain publications in farm literature have been published, however, none of these prior publications were more than one year before this invention or before the invention.

SUMMARY OF THE INVENTION (1) New and Different Function

We have invented a way to selectively apply liquid herbicides to weeds in a field after the emergence of the crop. We accomplish this by force feeding liquid herbicides through loosely woven synthetic rope. The herbicide-laden ropes are then brought into contact with weeds, thereby applying herbicide to the weeds. This manner of herbicide application is very selective and will not kill weeds at the expense of the growing crop. The selectivity is obtained as herbicide is only applied to plants which intersect the herbicide-laden ropes. The ropes may be adjusted such that they will apply herbicide only to weeds which they contact and not the growing crop.

The ropes are at about a 35° angle (±10°) to the direction of application. Therefore, as the rope passes the weeds, the rope wipes along the weed, rather than intersecting it at right angles, more effectively applying herbicide to the weed.

There is a reduced loss of herbicide due to evaporation as the herbicide is transferred from the reservoir to the ropes by a closed system of tubes. Even though there is a high evaporation rate, by force feeding the fluid herbicide into the rope, it is possible to keep the rope sufficiently damp with the herbicide to transfer an adequate amount of herbicide to any of the weeds wiping the rope.

On units which are designed to operate along slopes as in highway use, it is desirable to have several short sections of the rope and to have several reservoirs to force feed the ropes. The reservoirs are mounted at an adjustable distance above the ropes, so that the head on each of the sections can be adjusted. Also the ropes on the high end of one of these sections are connected at one end to a pressure of the higher section and the other end connected to a header of a lower section. Therefore, more herbicide is fed into one end of the ropes than the other.

There is virtually no maintenance necessary to keep our invention working as its components, synthetic rope and PVC tubing, are very simple.

Therefore, it may be seen that great results are obtained. The function of the combination are far greater than the sum of the functions of each of the individual parts.

(2) Objects of this Invention

An object of this invention is to selectively disperse liquid herbicide.

Further objects are to achieve the above with a device that is sturdy, compact, durable, lightweight, simple, safe, efficient, versatile, ecologically compatible, energy conserving, and reliable, yet inexpensive and easy to manufacture, adjust, operate and maintain.

The specific nature of the invention, as well as other objects, uses, and advantages thereof, will clearly appear from the following description and from the accompanying drawing, the different views of which are not scale drawings.

BRIEF DESCRIPTION OF THE DRAWING

FIG. 1 is a perspective view showing the invention in an agricultural field.

FIG. 2 is a schematic showing the invention on a slope with one wing shown folded up in dashed lines.

FIG. 6 is a detail of the attachment of the reservoirs to the frame.

DESCRIPTION OF THE PREFERRED EMBODIMENTS

Figure 3:
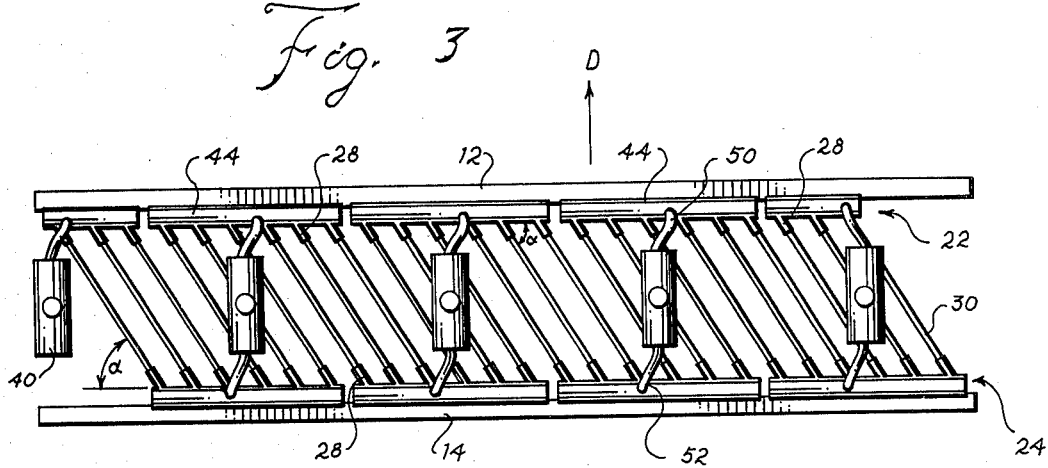
FIG. 3 is a plan view in schematic form, showing the arrangement of the ropes on the headers and the reservoir with the headers.
Figure 4:
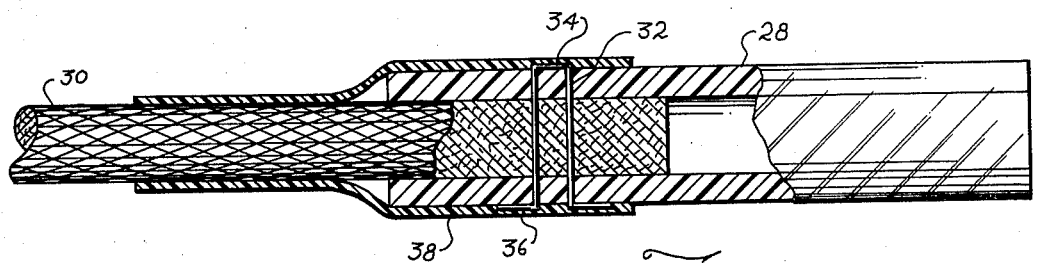
FIG. 4 is a sectional view through the tube, ropes, and sleeve.
Figure 5:
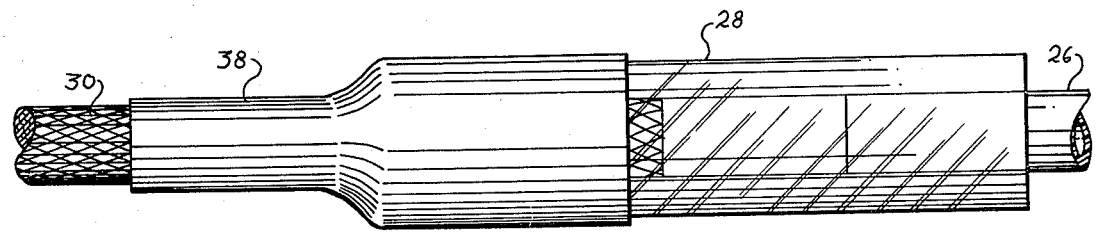
FIG. 5 is an elevational view of the tube, rope, and sleeve.

Referring to the drawings, there may be seen an embodiment of this invention. Specifically there is a frame 10 having a front horizontal bar 12 and a rear horizontal bar 14. Inasmuch as the frame itself extends traverse or normal to the direction of application as seen by arrow D, it is desirable to have the frames hinged or folded at point 16, so that when being transported from one location to another, the wings of the frame may be angled up so that they are not so wide while going down roadways. This is common with equipment of this sort and well understood by those skilled in the art. It will be understood that vehicle 18 is attached to the frame 10 and forms means for supporting the frame and moving it in the application direction "D". Also there is a standard hitch 20 connecting the frame to the vehicle whereby the height of the frame above the ground may be adjusted.

First or front header means 22 is attached to the front bar 12. Rear or second header means 24 is attached to the rear bar 14. It will be understood that other cross braces and the like extend between the front and rear bar to form a unified frame. The front header means 22 and rear header means 24 are for carrying herbicide. A series of nipples 26 extend from the front header means and a similar series of nipples 26 extend from the rear header means. Tube 28 is telescoped over each of the nipples.

A parallel series of ropes 30 extend from each of the tubes 28 on the front header bar to one of the tubes 28 on the rear header means. Each rope has two ends and one end is telescoped within the tube on the front header means and the other end is telescoped within a tube on the rear header means. Each of the ropes 30 is at an angle to said application direction "D". This angle is about 35° (±10°). Stated otherwise each of the ropes 30 is at an angle of between about 25° and about 45° to the application direction "D". The angle to the application direction "D" is complementary to the angle on the drawing which is the angle of the ropes to the header means 22, which is normal to the application direction. We have had good success with spacing the nipples 26, and thus the ropes, about 3 inches apart. Each of the ropes is about 20 inches long and has about 2 inches telescoped within each of the tubes 28. Therefore the ropes have about 16 inches of space between the ends of the tubes. They are not stretched taut, but are permitted to sag, as seen in FIG. 2.

Therefore it may be seen that as the frame is moved along the land to which the herbicide is to be applied that the ropes 30 will wipe along the weeds rather than contacting them momentarily as in the case that if the ropes are normal or at right angles to the direction of application.

We have had good success by using the tubes 28 to be a synthetic plastic material which can readily be cut by a knife. Each rope can be held within this tube by staple 32 extending through the tube 28 and the rope therein. The rope 30 forms a snug fit within the tube 28. The staple, after it is driven through the tube and rope will have its bight 34 flat against one side of the tube and the tips 36 flattened out against the diametrically opposed side of the tube. We have had good success by telescoping sleeve 38 of heat-shrinkable material over the tube and rope using about a 3 inch length of sleeve. Then the heat is applied to the sleeve 38 so that it shrinks to fit firmly and snuggly over the tube and rope. The sleeve extends over the staple bight and tips. Therefore herbicide is prevented from dripping from the ends of the tubes. Thus it may be seen that we provide seal means on each of the tubes and ropes for sealing the ropes and tubes. It will be understood that the herbicide used is a potent solution of herbicides with the capacity to kill any plant it touches. Therefore it is desirable not to have any of the herbicide dripping or it will kill desirable plants.

The herbicide within the header means 22 and 24 is maintained under a small pressure. This is accomplished by having supply means in the form of reservoir 40 mounted to the frame above the header means 22 and 24. Thus the reservoir forms a portion of the supply means connected to each tube supplying liquid herbicide under pressure to said tubes and thus pressure feeding said ropes. It is desirable that the height of the reservoir above the header means 22 and 24 be adjustable along one of the upright members 42 of the frame. Therefore, if under certain conditions it is felt like more pressure is needed at the header means and thus the tubes 28 to apply more herbicide to the ropes 30, it is readily accomplished by raising the reservoir 40 upon the upright member 42. Less pressure can be achieved by lowering the reservoir.

We have had good success using ropes of loosely woven synthetic material. Each rope is composed of 18 strands, the strands are composed of very fine elements. Fluid moves readily along these ropes by forced feeding.

The invention as described to this point is quite suitable for agricultural use. However as stated above, there is a use for such applicators by highway departments to prevent the growth of tall weeds along the highway right-of-ways. Often they will be used along highway right-of-ways at extreme slopes, as seen in FIG. 2, as compared to agricultural purposes. Therefore, if one end of the frame is considerably lower than the other end, problems result by obtaining the correct amount of pressure upon the ropes at each end.

We have solved this problem by using a series of front or first headers 44 and a series of back or second headers 46. Each header is no more than about 17 inches long, and therefore each header has six nipples 26 and tubes 28 extending from it. Normally any slope over which the vehicle 18 will comfortably travel will not be so great but what the pressure differential between one end of each of the headers 44 and 46 will be so great but what good operation can be accomplished. Also of the six ropes that extend from each header three will extend to a header about opposite it. Inasmuch as the ropes themselves extend at an angle, it may be seen that if the headers are fed from the same reservoir that one end of the rope will have a higher pressure because it will be at a lower elevation than the other end. Therefore, about half the ropes attached to each header 44 or 46 does not extend to an opposite header fed from the same reservoir, but it extends to a header fed by reservoir which will have a different elevation. This relationship is clearly shown in FIGS. 2 and 3.

A series of double reservoirs are mounted to frame members 42. Each double reservoir has one conduit 50 which extends to the first or front header 44 and a second conduit 52 which extends to the second or back header 46. Connections of the individual double reservoirs to the first header 44 and the second header 46 are clearly seen in the drawings.

Thus it may be seen that we have provided an applicator well adapted to be used along severe slopes as well as agricultural land having more gentle slopes.

As an aid to correlating the terms of the claims to the exemplary drawing, the following catalog of elements is provided:

- 10—frame
- 12—front bar
- 14—rear bar
- 16—point, fold
- 18—vehicle
- 20—hitch
- 22—front header means
- 24—rear header means
- 26—nipple
- 28—tube
- 30—rope
- 32—staple
- 34—bight
- 36—tips
- 38—sleeve
- 40—reservoir
- 42—member
- 44—front header
- 46—back header
- 48—double reservoirs
- 50—first conduit
- 52—second conduit
- "a"—angle
- "D"—Direction of application The embodiment shown and described above is only exemplary. We do not claim to have invented all the parts, elements or steps described. Various modifications can be made in the construction, material, arrangement, and operation, and still be within the scope of our invention. The limits of the invention and the bounds of the patent protection are measured by and defined in the following claims. The restrictive description and drawing of the specific example above do not point out what an infringement of this patent would be, but are to enable the reader to make and use the invention.

SUBJECT MATTER CLAIMED FOR PROTECTION

We claim as our invention:

1. In a wet rope applicator for applying herbicides to weeds comprising in combination:
   a. a loose woven synthetic rope having two ends,
   b. one end of the rope telescoped in one tube and
   c. the other end of the rope telescoped in another tube,
   d. seal means on each of the tubes and rope for sealing the rope and tubes,
   e. supply means connected to each tube for supplying liquid herbicide under pressure to said tubes and thus pressure feeding said rope,
   f. a frame having
      (i) a front horizontal bar and
      (ii) a back horizontal bar,
   g. vehicle means on the frame for supporting and moving in an application direction said frame along the land to which the herbicide is to be applied,
   h. a series of pairs of first and second headers on the frame for carrying herbicide,
   i. a parallel group of said ropes, each of said ropes extending from one of said tubes in the first header to one of said tubes in said second header, of each pair,
   j. a series of double outlet reservoirs of liquid herbicide
   k. each of said double outlet reservoirs fluidly connected to a first and a second header of one of said pairs,
   l. mounting means on each of the reservoirs for mounting the reservoir at an adjustable distance above the headers to which it is connected.

2. The invention as defined in limitations a. through l. of claim 1 wherein said seal means includes
   m. a sleeve of heat shrinkable material telescoped over the tube and rope,
   n. said sleeve shrunk to fit firmly and snuggly over the tube and rope.

3. The invention as defined in limitations a. through n. of claim 2 further comprising:
   o. a staple having a bight and tips extending through each tube and the rope telescoped therein,
      (i) with the bight of the staple on one side of the tube and the tips of the staple spread and flattened on the other side, and
      (ii) the sleeve over the staple bight and tips.

4. In a wet rope applicator for applying herbicides to weeds comprising in combination:
   a. a loose woven synthetic rope having two ends,
   b. one end of the rope telescoped in one tube and
   c. the other end of the rope telescoped in another tube,
   d. seal means on each of the tubes and rope for sealing the rope and tubes,
   e. supply means connected to each tube for supplying liquid herbicide under pressure to said tubes and thus pressure feeding said rope,
   f. a frame having
      (i) a front horizontal bar and
      (ii) a back horizontal bar,
   g. vehicle means on the frame for supporting and moving in an application direction said frame along the land to which the herbicide is to be applied,
   h. front header means on the front bar for carrying herbicide,
   i. back header means on the back bar for carrying herbicide, j. a parallel series of ropes, each rope extending from one of said tubes in the front header to one of said tubes in said back header, k. each of said ropes at an angle to said application direction, l. said angle being between about 25° and about 45°.

5. The invention as defined in limitations a. through l. of claim 4 further comprising:

m. said front header means including a series of front headers, n. said back header means including a series of back headers, o. a series of double outlet reservoirs of liquid herbicide, p. each of said double outlet reservoirs fluidly connected to a front header and a back header, and q. mounting means on each of the reservoirs for mounting the reservoir an adjustable distance above the headers to which it is connected.

6. The invention as defined in limitations a. through l. of claim 5 wherein said seal means includes m. a sleeve of heat shrinkable material telescoped over the tube and rope, n. said sleeve shrunk to fit firmly and snuggly over the tube and rope.

7. The invention as defined in limitations a. through n. of claim 6 wherein said supply means includes o. a reservoir of liquid herbicide, p. mounting means on the reservoir for mounting the reservoir an adjustable distance above the tube.

8. The invention as defined in claim 7 further comprising:

q. said front header means including a series of front headers, r. said back header means including a series of back headers, t. a series of double outlet reservoirs of liquid herbicide, u. each of said double outlet reservoirs fluidly connected to a front header and a back header.

9. In a wet rope applicator for applying herbicides to weeds comprising in combination:

a. a loose woven synthetic rope having two ends, b. one end of the rope telescoped in one tube and c. the other end of the rope telescoped in another tube, d. seal means on each of the tubes and rope for sealing the rope and tubes, e. supply means connected to each tube for supplying liquid herbicide under pressure to said tubes and thus pressure feeding said rope, f. a sleeve of heat shrinkable material telescoped over the tube and rope, g. said sleeve shrunk to fit firmly and snuggly over the tube and rope, h. a staple having a bight and tips extending through each tube and the rope telescoped therein, (i) with the bight of the staple on one side of the tube and the tips of the staple spread and flattened on the other side, and (ii) the sleeve over the staple bight and tips.

* * * * *